United States Patent [19]

Lim

[11] Patent Number: 5,757,861
[45] Date of Patent: May 26, 1998

[54] APPARATUS FOR CORRECTING PHASE ERROR OF VSB SIGNAL

[75] Inventor: Yong-Hee Lim, Seoul, Rep. of Korea

[73] Assignee: Daewoo Electronics Co., Ltd., Seoul, Rep. of Korea

[21] Appl. No.: 556,529

[22] Filed: Nov. 13, 1995

[30] Foreign Application Priority Data

Nov. 28, 1994 [KR] Rep. of Korea ............ 1994-31480

[51] Int. Cl.$^6$ ............................. H03D 1/24; H04B 1/10
[52] U.S. Cl. ................. 375/321; 375/349; 348/607; 329/357; 455/204; 455/304
[58] Field of Search ............ 375/226, 260–262, 375/265, 277, 321, 322, 324, 340, 341, 346, 349; 348/607; 455/296, 303, 304, 306, 204; 329/357

[56] References Cited

U.S. PATENT DOCUMENTS 5,546,132  8/1996  Kim et al. ................. 348/607
5,602,601  2/1997  Kim et al. ................. 348/607

*Primary Examiner*—Stephen Chin
*Assistant Examiner*—Amanda T. Le
*Attorney, Agent, or Firm*—Anderson, Kill & Olick, P.C.

[57] ABSTRACT

An error detecting and correcting apparatus incorporated in a trellis decoder to compensate effects of 180° phase errors of a transmitted N-level VSB (Vestigial Sideband) signal in a GA (Grand Alliance) HDTV (High Definition Television) receiver, the transmitted signal including a transmitted reference signal and a transmitted data signal, the decoder including an error detector for comparing a predetermined reference signal with the transmitted reference signal to provide an error signal denoting the presence or absence a 180° phase error, a phase corrector for inverting the sign of the transmitted data signal to provide an inverted transmitted data signal, a switch for selectively providing the transmitted data signal or the inverted transmitted data signal in response to the error signal, and a trellis decoder for decoding the transmitted data signal or the inverted data signal provided by the switch.

8 Claims, 3 Drawing Sheets

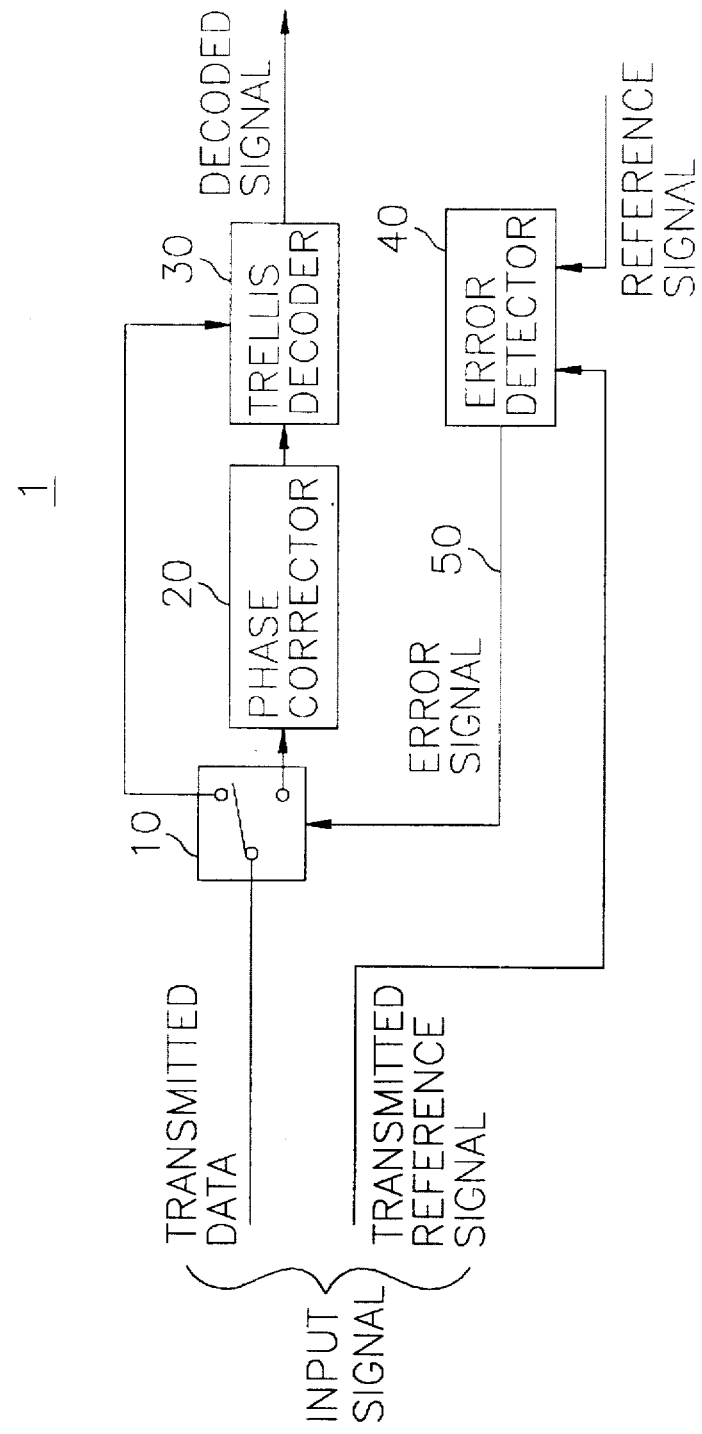

APPARATUS FOR CORRECTING PHASE ERROR OF VSB SIGNAL

FIELD OF THE INVENTION

The present invention relates to an apparatus for correcting a phase error of a Vestigial Sideband ("VSB") signal of a Grand Alliance("GA") High Definition Television ("HDTV") system; and, more particularly, to an apparatus for correcting a 180° phase error in a receiver of the GA HDTV system.

DESCRIPTION OF THE PRIOR ART

Digital data, for example, digitized video signals for use in broadcasting high definition television signals, can be transmitted over terrestrial VHF or UHF analog channel to end users.

In order to communicate digital data via an analog channel, the data is preferably modulated using, for example, a form of Pulse Amplitude Modulation("PAM"). In PAM, each signal is of a pulse whose amplitude level is determined by a digital data.

A Quadrature Amplitude Modulation ("QAM") is often used to increase the amount of data that can be transmitted within an available channel bandwidth. The QAM is a form of PAM wherein a plurality of bits of information is transmitted in a pattern referred to as a "constellation" that can contain, for example, sixteen or thirty-two points. In a 32-QAM, symbol amplitudes of -5, -3, -1, 1, 3, 5 in each of in-phase ("I") and quadrature-phase ("Q") channels are typically used.

Meanwhile, a recently proposed GA HDTV system uses a VSB technique wherein the modulated signals with predetermined amplitude levels, e.g., -7, -5, -3, -1, 1, 3, 5 and 7 or -15, 13, -11, -9, -7, -5, -3, -1, 1, 3, 5, 7, 9, 11, 13 and 15 for a terrestrial broadcast mode, in the I channel are used with no Q channel component included therein. The use of VSB technique in the possible standard HDTV system is motivated by the fact that the signal has additional features that enhance it when reception thereof is difficult.

A trellis coding technique is incorporated into the GA HDTV system to reduce effects of a channel error during transmission process. Moreover, various techniques, e.g., a data interleaving technique and a Reed-Solomon Code, are used in the GA HDTV system for further improving the picture quality.

However, analog channels tend to deliver corrupted and transformed versions of their input waveforms. Corruption of the waveform, usually statistical, may be additive and/or multiplicative of, e.g., possible background thermal noises, impulse noises and fadings.

To alleviate the effects stemming from the errors introduced in the transmission process, a channel equalizer and a phase tracker are used in a receiver of the GA HDTV system. The channel equalizer compensates for linear channel distortions which originate from the transmission channel or imperfect components within the receiver. The phase tracker eliminates the effect of phase distortion by exploiting the characteristic of the VSB signal. The features of the GA HDTV system stated above are well documented in "Grand Alliance HDTV System Specification Version 2.0" proposed on Dec. 7, 1994.

Referring to FIGS. 1A and 1B, there are provided illustrations of 8-level VSB signals in the presence of phase errors. As stated above, in the GA HDTV system, digital signals are modulated to have one of 8 predetermined values on an I-axis. Therefore, at the phase tracker of the GA HDTV system, a transmitted signal that does not lie on the I-axis is considered to have been affected by phase errors during the transmission process.

In FIGS. 1A and 1B, original signals generated at a transmitter of the GA HDTV system are represented as dots and transmitted signals received at the receiver of the GA HDTV system are depicted as squares.

In FIG. 1A, a transmitted signal depicted as square is a distorted version of a corresponding original signal due to a phase error and can be removed from a correctly transmitted signal based on a discrepancy in magnitude of I component. The magnitude of I component of a transmitted signal is denoted as $d_e$ while that of an original signal is represented as d.

Unfortunately, however, in case of a phase error of 180° degrees, a transmitted signal also has one of the 8 predetermined values as shown in FIG. 1B. Therefore, the transmitted signal with a 180° phase error may be falsely recognized as a correct signal despite its opposite sign at the phase tracker of the GA HDTV system.

SUMMARY OF THE INVENTION

It is, therefore, a primary object of the present invention to provide a novel apparatus for detecting and correcting a 180° phase error of a transmitted VSB signal in a GA HDTV receiver.

In accordance with the present invention, there is provided an apparatus for decoding a transmitted data signal in response to a transmitted reference signal, the transmitted data signal and the transmitted reference signal being the transmitted versions of a data signal and a reference signal via a transmission channel, respectively, and wherein the reference signal is a predetermined signal and the data signal is modulated to have one of N modulated signal values by employing a N-level Vestigial Sideband (VSB) technique, said N being a positive even number and said N modulated signal values including N/2 pairs of signal values, each of the N/2 pairs of signal values containing a positive value and a negative value with a predetermined absolute value, the apparatus comprising:

an error detector for comparing the reference signal with the transmitted reference signal, thereby providing an error signal denoting the presence or absence of a 180° phase error;

a phase corrector for inverting the sign of the transmitted data signal, to thereby provide an inverted transmitted data signal;

switching means for selectively providing the transmitted data signal or the inverted transmitted data signal in response to the error signal; and a decoder for decoding the transmitted data signal or the inverted transmitted data signal provided by the switching means.

BRIEF DESCRIPTION OF THE DRAWINGS

The above and other objects and features of the present invention will become apparent from the following description of preferred embodiments given in conjunction with the accompanying drawings, in which:

FIG. 2 presents a decoder of the present invention.

DETAILED DESCRIPTION OF THE PREFERRED EMBODIMENTS

Figure 1A:
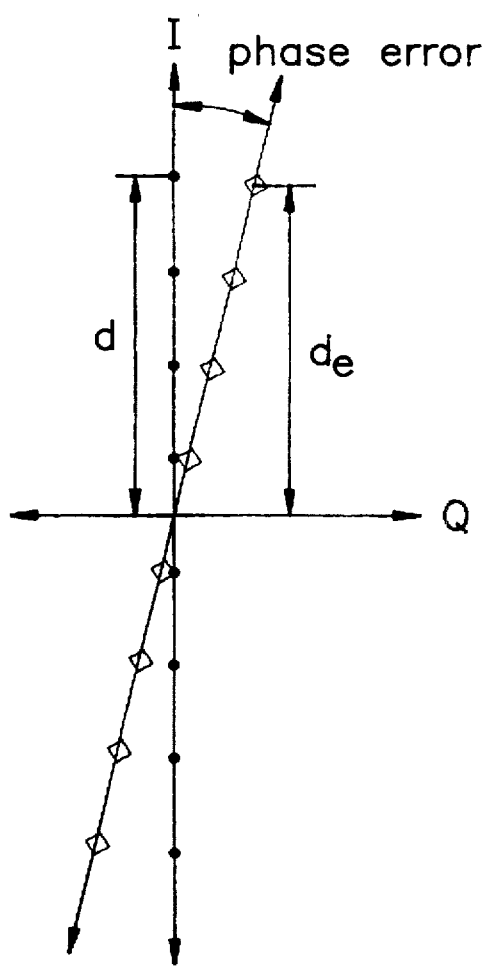
FIGS. 1A and 1B illustrate 8-level VSB signals in the presence of phase errors.
Figure 1B:
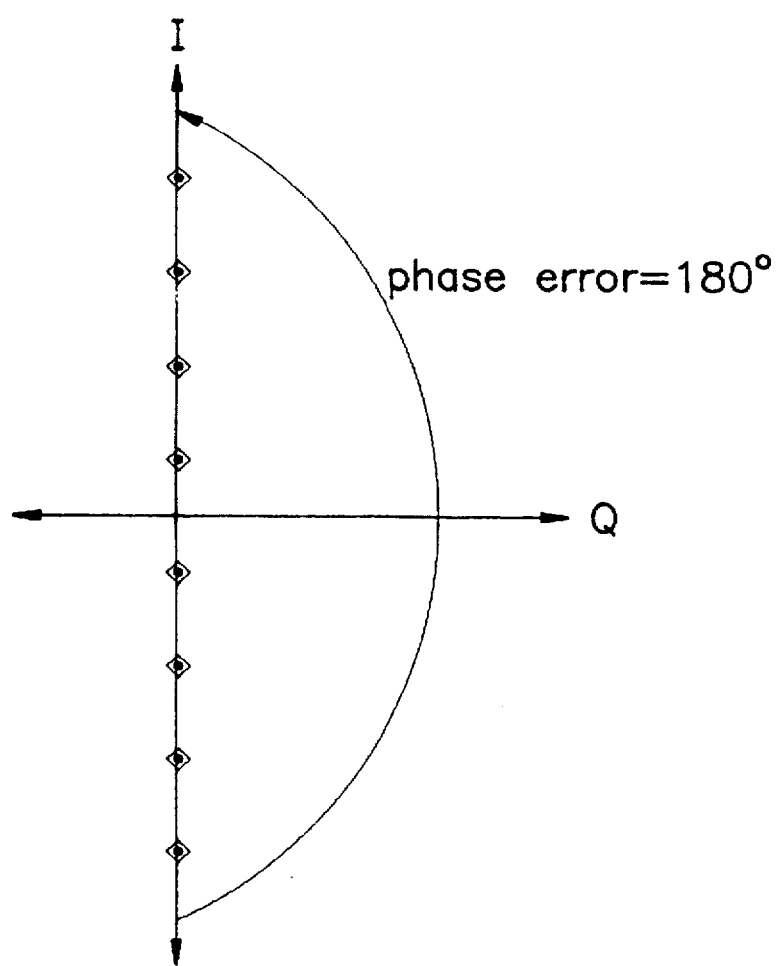

Referring to FIG. 2, there is shown a decoder 1 of the present invention. It includes a trellis decoder 30 which employs a soft decision maximum likelihood decoding technique, e.g., a Viterbi decoding, for decoding a convolutional code. To overcome the problem of a 180° phase error which may be present in a transmitted signal, an error detector 40 and a phase corrector 20 are attached to the trellis decoder 30 together with a switch 10.

An input signal to the decoder 1 of the present invention includes a transmitted data signal and a transmitted reference signal. The transmitted data signal is a transmitted version of a data signal that is to be reconstructed at the decoder 1 of the present invention and is fed to the switch 10. The data signal is trellis coded and modulated by using an 8 or 16 level VSB technique at a GA HDTV transmitter and transmitted to a GA HDTV receiver through a transmission channel. Similarly, the transmitted reference signal is a transmitted version of a predetermined reference signal and is fed to the error detector 40.

The error detector 40 serves to detect a 180° phase error of the transmitted reference signal. To do this, a reference signal having a predetermined value is fed to the error detector 40. A correct value of the reference signal is determined according to the system design and is made known to the decoder 1 a priori. By comparing the transmitted reference signal with the correct one, the presence of a 180° phase error can be easily detected at the error detector 40.

Usually, it is required that the reference signal be transmitted repeatedly on a regular interval so that channel errors can be detected and corrected repeatedly to cope with a time drift in channel characteristics.

As is well known in the art, sync signals indicating certain positions in a frame of video signals are frequently used for the synchronization of a video processing system. For example, a horizontal sync signal is inserted after each line of a typical television signal. Since the sync signal is inserted repeatedly and is predetermined according to the system design, it. meets the requirements of a reference signal stated above. Preferably, a field sync signal of a GA HDTV system may be used as the reference signal.

At the error detector 40, an error signal is developed on a line 50 to control the switch 10 by comparing the transmitted reference signal with the correct reference signal. The switch 10 operates in response to the error signal so that the transmitted data signal is fed directly to the trellis decoder 30 in the absence of a 180° phase error. Should there be detected a 180° phase error, the transmitted data signal is first coupled to the phase corrector 20 wherein the sign of the signal is converted to an opposite sign of the signal inputted thereto and then fed to the trellis decoder 30.

The inverted data signal or the data signal fed to the trellis decoder 30 is decoded by using, e.g., Viterbi algorithm, and fed to a subsequent part, e.g., a data deinterleaver, of the GA HDTV receiver. However, different types of decoders can be employed in place of the trellis decoder 30 depending on the overall system design and the signal format processed therein.

At the phase corrector 20, the data signal is recovered by simply changing the sign of the transmitted data signal. For example, in case the transmitted data signal is represented by a plurality of data bits with a Most Significant Bit ("MSB") denoting its sign, the 180° phase error can be easily corrected by XORing the MSB of the transmitted data signal with binary 1.

By employing the decoder of the present invention in the GA HDTV receiver, a 180° phase error which is not detected in the conventional phase tracker can be effectively eliminated, thereby ensuring an improved picture quality.

While the present invention has been described with respect to the particular embodiments, it will be apparent to those skilled in the art that various changes and modifications may be made without departing from the spirit and scope of the invention as defined in the following claims.

What is claimed is:

1. An apparatus for decoding a transmitted data signal in response to a transmitted reference signal, the transmitted data signal and the transmitted reference signal being the transmitted versions of a data signal and a reference signal via a transmission channel, respectively, and wherein the reference signal is a predetermined signal and the data signal is modulated to have one of N modulated signal values by employing a N-level Vestigial Sideband (VSB) technique, said N being a positive even number and said N modulated signal values including N/2 pairs of signal values, each of the N/2 pairs of signal values containing a positive value and a negative value with a predetermined absolute value, the apparatus comprising:

an error detector for comparing the reference signal with the transmitted reference signal, thereby providing an error signal denoting the presence or absence of a 180° phase error;

a phase corrector for inverting the sign of the transmitted data signal, to thereby provide an inverted transmitted data signal;

switching means for selectively providing the transmitted data signal or the inverted transmitted data signal in response to the error signal; and a decoder for decoding the transmitted data signal or the inverted transmitted data signal provided by the switching means.

2. The apparatus of claim 1, wherein N is 8.

3. The apparatus of claim 2, wherein said N modulated signal values are -7, -5, -3, -1, 3, 5 and 7.

4. The apparatus of claim 1, wherein N is 16.

5. The apparatus of claim 4, wherein said N modulated signal values are -15, -13, -11, -9, -7, -5, -3, -1, 1, 3, 5, 7, 9, 11, 13 and 15.

6. The apparatus of claim 1, wherein the phase corrector includes means for XORing a sign bit of the transmitted data signal with 1.

7. The apparatus of claim 1, wherein the decoder is a trellis decoder.

8. The apparatus of claim 7, wherein the trellis decoder includes a soft decision Viterbi decoder.

* * * * *

UNITED STATES PATENT AND TRADEMARK OFFICE
CERTIFICATE OF CORRECTION

PATENT NO. : 5,757,861
DATED : May 26, 1998
INVENTOR(S) : Yong-Hee Lim

It is certified that error appears in the above-indentified patent and that said Letters Patent is hereby corrected as shown below:

On the title page, Item

[54] APPARATUS FOR CORRECTING PHASE ERROR OF A VSB SIGNAL

[30]  Foreign Application Priority Data

Nov. 28, 1994   [KR]   Rep. of Korea        94-31480

Signed and Sealed this

Eleventh Day of August 1998

*Attest:*

BRUCE LEHMAN

*Attesting Officer*     *Commissioner of Patents and Trademarks*